US008347392B2

(12) United States Patent
Chess et al.

(10) Patent No.: US 8,347,392 B2
(45) Date of Patent: Jan. 1, 2013

(54) APPARATUS AND METHOD FOR ANALYZING AND SUPPLEMENTING A PROGRAM TO PROVIDE SECURITY

(75) Inventors: Brian Chess, Mountain View, CA (US); Arthur Do, Danville, CA (US); Roger Thornton, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1136 days.

(21) Appl. No.: 11/510,135

(22) Filed: Aug. 25, 2006

(65) Prior Publication Data

US 2007/0074169 A1    Mar. 29, 2007

Related U.S. Application Data

(60) Provisional application No. 60/711,972, filed on Aug. 25, 2006.

(51) Int. Cl.
*G06F 11/30* (2006.01)
*G08B 23/00* (2006.01)
*G06F 12/14* (2006.01)

(52) U.S. Cl. ........... 726/25; 717/124; 717/126; 717/131

(58) Field of Classification Search .................... 726/25; 717/126, 124, 131
See application file for complete search history.

(56) References Cited

U.S. PATENT DOCUMENTS

| | | | |
|---|---|---|---|
| 4,667,290 A | 5/1987 | Goss et al. | |
| 5,339,238 A | 8/1994 | Benson | |
| 5,414,853 A | 5/1995 | Fertig et al. | |
| 5,440,723 A | 8/1995 | Arnold et al. | |
| 5,502,815 A | 3/1996 | Cozza | |
| 5,613,117 A | 3/1997 | Davidson et al. | |
| 5,657,483 A | 8/1997 | Kardach et al. | |
| 5,699,507 A | 12/1997 | Goodnow, II et al. | |
| 5,867,647 A | 2/1999 | Haigh et al. | |
| 5,928,363 A * | 7/1999 | Ruvolo | 726/22 |
| 5,983,348 A | 11/1999 | Ji | |
| 6,182,226 B1 * | 1/2001 | Reid et al. | 726/15 |
| 6,408,382 B1 | 6/2002 | Pechanek et al. | |
| 6,487,701 B1 | 11/2002 | Dean et al. | |
| 6,647,400 B1 | 11/2003 | Moran | |
| 6,687,873 B1 | 2/2004 | Ballantyne et al. | |
| 6,907,430 B2 | 6/2005 | Chong et al. | |
| 7,058,925 B2 | 6/2006 | Ball et al. | |
| 7,093,239 B1 | 8/2006 | van der Made | |

(Continued)

FOREIGN PATENT DOCUMENTS

EP        1934742        7/2009

(Continued)

OTHER PUBLICATIONS

Akkar, M. et al. "Automatic Integration of Counter-Measures Against Fault Injection Attacks", 2003.*

(Continued)

*Primary Examiner* — Michael Simitoski

(57) ABSTRACT

A computer readable storage medium has executable instructions to perform an automated analysis of program instructions. The automated analysis includes at least two analyses selected from an automated analysis of injection vulnerabilities, an automated analysis of potential repetitive attacks, an automated analysis of sensitive information, and an automated analysis of specific HTTP attributes. Protective instructions are inserted into the program instructions. The protective instructions are utilized to detect and respond to attacks during execution of the program instructions.

17 Claims, 4 Drawing Sheets

U.S. PATENT DOCUMENTS

| | | | |
|---|---|---|---|
| 7,207,065 B2* | 4/2007 | Chess et al. ..................... | 726/25 |
| 7,272,821 B2 | 9/2007 | Chittar et al. | |
| 7,284,274 B1 | 10/2007 | Walls et al. | |
| 7,478,365 B2 | 1/2009 | West et al. | |
| 7,483,972 B2 | 1/2009 | Bhattacharya et al. | |
| 7,975,306 B2* | 7/2011 | Chess et al. ..................... | 726/25 |
| 2001/0027383 A1 | 10/2001 | Maliszewski | |
| 2002/0064279 A1* | 5/2002 | Uner ............................. | 380/44 |
| 2002/0066024 A1 | 5/2002 | Schmall et al. | |
| 2002/0073330 A1 | 6/2002 | Chandnani et al. | |
| 2003/0033542 A1* | 2/2003 | Goseva-Popstojanova et al. ........................... | 713/201 |
| 2003/0120951 A1 | 6/2003 | Gartside et al. | |
| 2003/0149900 A1* | 8/2003 | Glassman et al. ............ | 713/202 |
| 2003/0159063 A1* | 8/2003 | Apfelbaum et al. .......... | 713/200 |
| 2004/0111713 A1 | 6/2004 | Rioux | |
| 2004/0128584 A1 | 7/2004 | Mandava et al. | |
| 2004/0133777 A1 | 7/2004 | Kiriansky et al. | |
| 2004/0230491 A1* | 11/2004 | Messer et al. .................. | 705/26 |
| 2004/0255163 A1 | 12/2004 | Swimmer et al. | |
| 2004/0255277 A1 | 12/2004 | Berg et al. | |
| 2004/0260940 A1 | 12/2004 | Berg et al. | |
| 2004/0268307 A1 | 12/2004 | Plesko et al. | |
| 2004/0268322 A1 | 12/2004 | Chow et al. | |
| 2005/0010804 A1 | 1/2005 | Bruening | |
| 2005/0010806 A1 | 1/2005 | Berg et al. | |
| 2005/0010896 A1 | 1/2005 | Meliksetian et al. | |
| 2005/0015752 A1 | 1/2005 | Alpern et al. | |
| 2005/0028002 A1 | 2/2005 | Christodorescu et al. | |
| 2005/0198099 A1* | 9/2005 | Motsinger et al. ............ | 709/200 |
| 2005/0273854 A1* | 12/2005 | Chess et al. ..................... | 726/22 |
| 2005/0273859 A1* | 12/2005 | Chess et al. ..................... | 726/25 |
| 2005/0273860 A1 | 12/2005 | Chess et al. | |
| 2005/0273861 A1* | 12/2005 | Chess et al. ..................... | 726/25 |
| 2006/0095895 A1* | 5/2006 | Sudheer ........................ | 717/130 |
| 2006/0178941 A1 | 8/2006 | Purnell, III | |
| 2006/0212438 A1* | 9/2006 | Ng ................................... | 707/4 |
| 2006/0242136 A1* | 10/2006 | Hammond et al. ............... | 707/4 |
| 2006/0253906 A1 | 11/2006 | Rubin et al. | |
| 2006/0259973 A1* | 11/2006 | Sima et al. ..................... | 726/25 |
| 2007/0107058 A1* | 5/2007 | Schuba et al. .................. | 726/23 |
| 2007/0240138 A1* | 10/2007 | Chess et al. .................... | 717/143 |

FOREIGN PATENT DOCUMENTS

| | | |
|---|---|---|
| JP | 2001-514411 | 9/2001 |
| JP | 2009-501392 | 1/2009 |

OTHER PUBLICATIONS

Chander, Ajay et al. "Mobile Code Security by Java Bytecode Instrumentation", 2001.*
Cabral, Bruno et al. "RAIL: Code Instrumentation for .NET", 2005.*
Evans, David et al. "Flexible Policy-Directed Code Safety", May 1999.*
Huang, Yao-Wen et al. "Securing Web Application Code by Static Analysis and Runtime Protection", May 2004.*
Lee, Dustin et al. "Detecting and Defending againstWeb-Server Fingerprinting", 2002.*
Cook, Steven. "A Web Developer's Guide to Cross-Site Scripting", Jan. 2003.*
Kolsek, Jitja. "Session Fixation Vulnerability in Web-based Applications", Dec. 2002.*
Nguyen-Tuong, Anh et al. "Automatically Hardening Web Applications Using Precise Tainting", Jun. 2005.*
Shyr, Wei-Mei et al. "Introduction to Linux Networking and Security", 1999.*
Stern, Andrew. "Web Application Vulnerabilities", Oct. 2004.*
Wang, Ke et al. "Anomalous Payload-Based Network Intrusion Detection", 2004.*
Entwisle, Stephen. "SecurityFocus Microsoft Newsletter #128", Mar. 2003.*
Guyer, Samuel Z. et al. "Detecting Errors with Configurable Whole-program Dataflow Analysis", 2002.*
Rothfuss, James. "Windows NT 4.0 Workstation Security Advisor, version 1.3", May 1998.*
Vigna, Giovanni et al. "A Stateful Intrusion Detection System for World-Wide Web Servers", 2003.*
Grossman, Jeremiah. "Cross-Site Tracing (XST)", Jan. 2003.*
International Search Report and Written Opinion mailed Oct. 19, 2007 for International Application No. PCT/US06/33639, 8 pages.
David A. Wagner, "Janus: An Approach for Confinement of Untrusted Applications," University of California at Berkeley, California, USA, 1999, pp. 1-59.
Ulfar Erlingsson and Fred B. Schneider, "IRM Enforcement of Java Stack Inspection," Cornell University, Ithaca, New York, USA, Feb. 19, 2000, pp. 1-26.
Diego Zamboni, "Using Internal Sensor for Computer Intrusion Detection," Purdue University, Aug. 2001, pp. I-XIV, 1-151.
BCEL-Byte Code Engineering Library (BCEL), "The Apache Jakarta Project," [online], last published: Jun. 3, 2006, pp. 1-27. Retrieved from the internet: URL: http://jakarta.apache.org/bcel/manual.html.
Eclipse-AspectJ, "The AspectJ Programming Guide," [online], Copyrigh 1998-2001, Xerox Corporation, Palo Alto Research Center, pp. 1-129. Retrieved from the internet: URL: http://www.eclipse.org/aspectj/.
Tor, "Tor: An Anonymous Internet Communication System," [online], [retrieved on Oct. 26, 2006, pp. 1-2]. Retrieved from the internet: URL: http://tor.eff.org/.
Tor, "Tor: Overview," [online], [retrieved on Nov. 17, 2006, pp. 1-2]. Retrieved from the internet: URL: http://tor.eff.org/.
Chess B. et al. "Static Analysis for Security" IEEE Security and Privacy< IEEE Computer Society, NE York, NY, US, vol. 2, No. 6, Nov. 1, 2004, p. 76-79, XP011123183, ISSN 1540-7993.
McGraw, G. "From the ground up: the DIMACS software security workshop" XP002559149The Institution of Electrical Engineers, Stevenage, GB; Mar. 2003.
McGraw, G. "Software Security" IEEE Security and Privacy, IEEE Computer Society, NY, US, vol. 2, No. 2, Mar. 1, 2004, p. 80-83, XP011109971 ISSN 1540-7993.
EP 05748199 Supplementary European Search Report mailed Apr. 3, 2010.
Van Der Merwe, G. et al. "Software source code, visual risk analysis: an example" Computers & Security, Elsevier Science Publishers. Amsterdam, NL, vol. 17, No. 3, Jan. 1, 1998 p. 233-252, XP004130084, ISSN 0167-4048.
Aho et al., "Principles of Compiler Design", Addison-Wesley Publishing Company, Bell Telephone Laboratories, Incorporated, Philippines (1977), 7 pages.
Ashcraft et al., "Using Programmer-Written Compiler Extensions to Catch Security Holes", IEEE Symposium on Security and Privacy (2002), 17 pages.
Banatre et al., "Mechanical Proofs of Security Properties", Institut de Recherche, France, Publication interne No. 825, (May 1994), 32 pages.
Blyth, "An XML-based Architecture to Perform Data Integration and Data Unification in Vulnerability Assessments", Information Security Technical Report, 8(4):14-25, 2003.
Bush et al., "A Static Analyzer for Finding Dynamic Programming Errors", Software Practice and Experience, 30 (7):775-802 (2000), 24 pages.
Chess, "Improving Computer Security Using Extended Static Checking", IEEE Symposium on Security and Privacy (May 2002), 14 pages.
Detlefs et al., "Extended Static Checking", Technical Report 159, Compaq Systems Research Center (Dec. 1998), 50 pages.
Devanbu, "Genoa—A Customizable, Language- and Front-End Independent Code Analyzer", ACM 0-89791-504-6, pp. 307-317, 1992.
GCC, "9.2 Gimple", The GNC Compiler Collection (GCC) Internals, http://gcc.gnu.org/onlinedocs/gcc-4.0.4/gccint/GIMPLE.html, downloaded Oct. 16, 2007, 1 page.
"GCC, the GNU Compiler Collection", GNU Project, http://gcc.gnu.org, downloaded Oct. 16, 2007, 2 pages.
Gordon et al., "Typing a Multi-Language Intermediate Code", Technical Report MSR-TR-2000-106, Microsoft Research, Microsoft Corporation, Redmond, WA (Dec. 2000), 58 pages.

Java, "15.12 Method Invocation Expressions", http://java.sun.com/docs/books/jls/second_edition/html/expressions.doc.html, downloaded Mar. 4, 2005, 14 pages.

Java, "Specifications, developers.sun.com", http://java.sun.com/products/ejb/docs.html, downloaded Mar. 4, 2005, 4 pages.

Java, "Reference, developers.sun.com", http://java.sun.com/products/jdbc/reference/index.html, downloaded Mar. 4, 2005, 2 pages.

Java, "Package java.lang.reflect", http://java.sun.com/j2se/1.4.2/docs/api/java/lang/reflect/package-summary.html, downloaded Mar. 4, 2005, 2 pages.

Java, "Package java.rmi", http://java.sun.com/j2se/1.4.2/docs/api/java/rmi/package-summary.html, downloaded Mar. 4, 2005, 3 pages.

Java White Paper, "The Java Language Environment", http://java.sun.com/docs/white/langenv/Neutral.doc1.html, downloaded Oct. 16, 2007, 1 page.

Macrakis, "From UNCOL to ANDF: Progress in Standard Intermediate Languages", Open Software Foundation (Jun. 1993), 18 pages.

Melbourne et al., "Penetration Testing for Web Applications (Part Three)", (Aug. 2003), 7 pages.

Rustan et al., "Checking Java Programs via Guarded Commands", Compaq Systems Research Center, Palo Alto, CA, SRC Technical Report 1999-002, (May 1999), 9 pages.

Shankar et al., "Detecting Format String Vulnerabilities with Type Qualifiers", Proceedings of the 10th USENIX Security Symposium (2001), 16 pages.

USPTO Portal, ACM Digital Library search results, http://portal.acm.org/results.cfm? coll=ACM&dl=ACM&CFID=6277206&CFTOKEN=1724..., (Dec. 2006), 6 pages.

van den Brand et al., "Re-engineering Needs Generic Programming Language Technology", ACM SIGPLAN Notices, 8 pages, Feb. 1997.

Viega et al., "ITS4: A Static Vulnerability Scanner for C and C++ Code", Reliable Software Technologies, Dulles, VA, Proceedings of the Annual Security Applications Conference (2000), 15 pages.

"xGCC—A Program Analysis Tool Based on a Modified GNU—Compiler", http://www.cs.stevens.edu/~wbackes/xGCC/index.html, downloaded Oct. 16, 2007, 3 pages.

Zovi, "Security Applications of Dynamic Binary Translation", Thesis Paper, University of New Mexico, Albuquerque, NM, (Dec. 2002), 54 pages.

* cited by examiner

Fortify AppDefense

Fortify AppDefense

Select Guards

- ☑ SQL Injection
- ☑ Information Leakage
- ☑ Buffer Overflow
- ☑ Cross-Site Scripting
- ☑ Site Defacement
- ☑ Cookie Tampering
- ☑ HTTP Header Tampering
- ☑ Form-Field Tampering
- ☑ URL Overflow Select filters

- ☑ White List
- ☑ Black List

[<Back] [Next>] [Finish] [Cancel]

*FIG. 3*

APPARATUS AND METHOD FOR ANALYZING AND SUPPLEMENTING A PROGRAM TO PROVIDE SECURITY

CROSS REFERENCE TO RELATED APPLICATIONS

This application claims the benefit of U.S. Provisional Application Ser. No. 60/711,972, entitled "Apparatus and Method for Analyzing Binary Code and Inserting Binary Code to Provide Security," filed Aug. 25, 2005, the contents of which are hereby incorporated by reference in their entirety.

BRIEF DESCRIPTION OF THE INVENTION

This invention relates generally to software security. More particularly, this invention relates to the analysis of code to identify security flaws and to responsively insert protective code.

BACKGROUND OF THE INVENTION

There are many drawbacks associated with existing software security systems. In particular, existing software security systems are typically limited to monitoring events through the host operating system or by observing the network traffic going to and from a program.

This approach is limited to information external to a program. Thus, the prior art is not able to make use of contextual information within a program. As a result, prior art techniques, such as application firewalls and intrusion prevention systems, commonly generate an unacceptable amount of false negatives and false positives.

It would be highly desirable to reduce the number of false negatives and false positives associated with existing software security systems. In addition, it would be highly desirable to detect many broad categories of attacks with more accuracy and precision than possible with existing software security systems.

SUMMARY OF THE INVENTION

The invention includes a computer readable storage medium with executable instructions to perform an automated analysis of program instructions. The automated analysis includes at least two analyses selected from an automated analysis of injection vulnerabilities, an automated analysis of potential repetitive attacks, an automated analysis of sensitive information, and an automated analysis of specific HTTP attributes. Protective instructions are inserted into the program instructions. The protective instructions are utilized to detect and respond to attacks during execution of the program instructions.

BRIEF DESCRIPTION OF THE FIGURES

The invention is more fully appreciated in connection with the following detailed description taken in conjunction with the accompanying drawings, in which:

FIG. 3 illustrates another graphical user interface that may be used in accordance with an embodiment of the invention.

Like reference numerals refer to corresponding parts throughout the several views of the drawings.

DETAILED DESCRIPTION OF THE INVENTION

Figure 1:
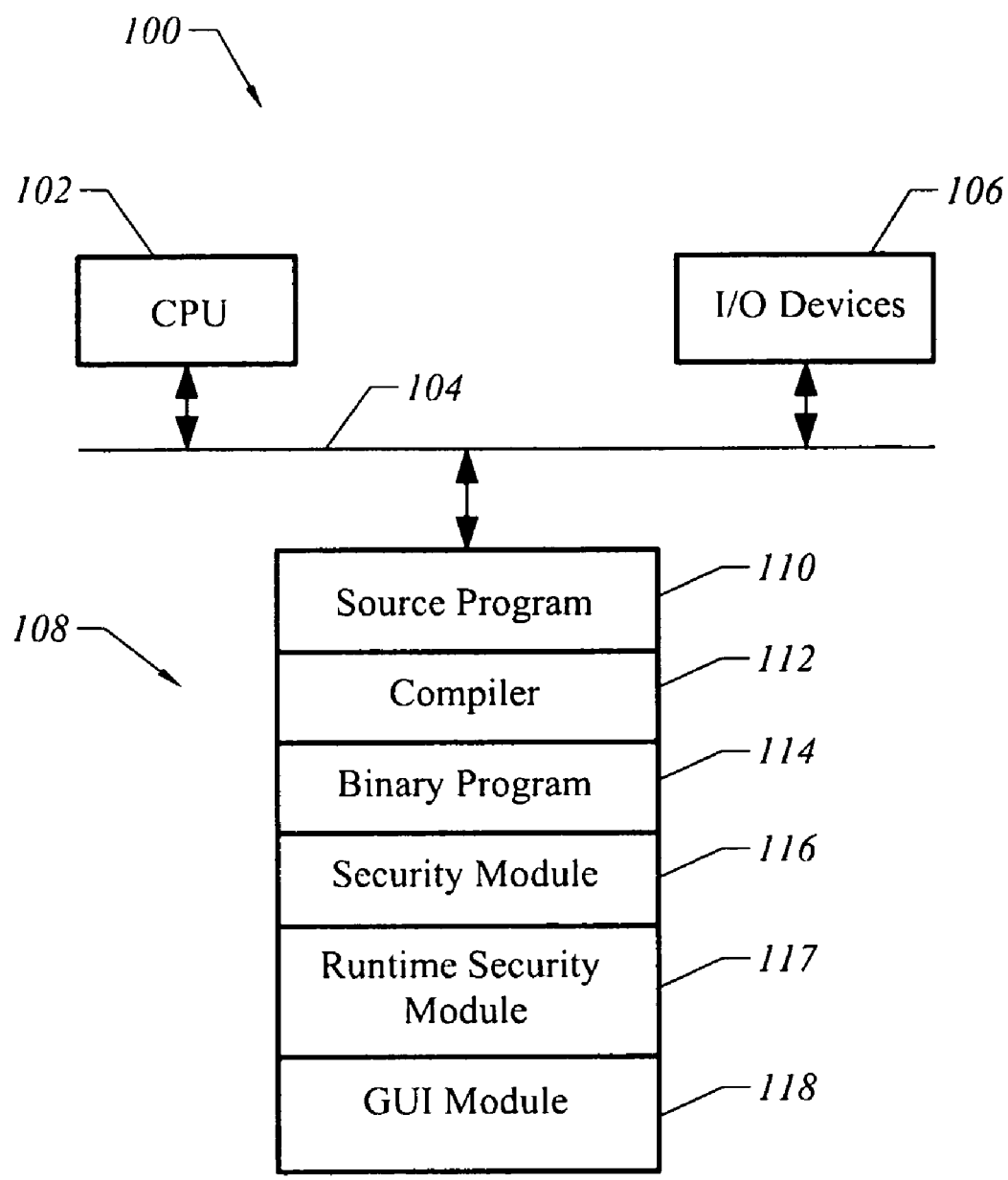
FIG. 1 illustrates a computer configured in accordance with an embodiment of the invention.

FIG. 1 illustrates a computer 100 configured in accordance with an embodiment of the invention. The computer 100 includes a central processing unit 102 connected to a bus 104. A set of input/output devices 106 is also connected to the bus 104. The set of input/output devices 106 may include a keyboard, mouse, display, printer, network connection and the like. Also connected to the bus 104 is a memory 108. The memory 108 stores a source code program 110. For example, the source code program 110 may be generated on computer 100 or it may be received from a networked computer that communicates with the computer 100 via input/output devices 106.

The memory 108 also stores a compiler 112, which compiles source program 110 to produce a compiled (or binary) program 114. The foregoing components are standard. The invention is directed toward the security module 116 and the runtime security module 117 stored in memory 108. The security module 116 identifies security vulnerabilities within a source program 110 or a compiled (binary) program 114. In response to such vulnerabilities, the security module 116 inserts code, e.g., source code or binary code. Thereafter, at run time the code inserted into the compiled program generates security events. These security events are analyzed by the runtime security module 117, which is able to respond to the security events. For example, suspicious events may be logged, attacks may be interrupted, and defensive actions may be taken.

A graphical user interface module 118 may be associated with the security module 116. The graphical user interface module 118 includes executable code to produce user interfaces that allow the selection of a program to protect and the selection of various protective measures.

Figure 2:
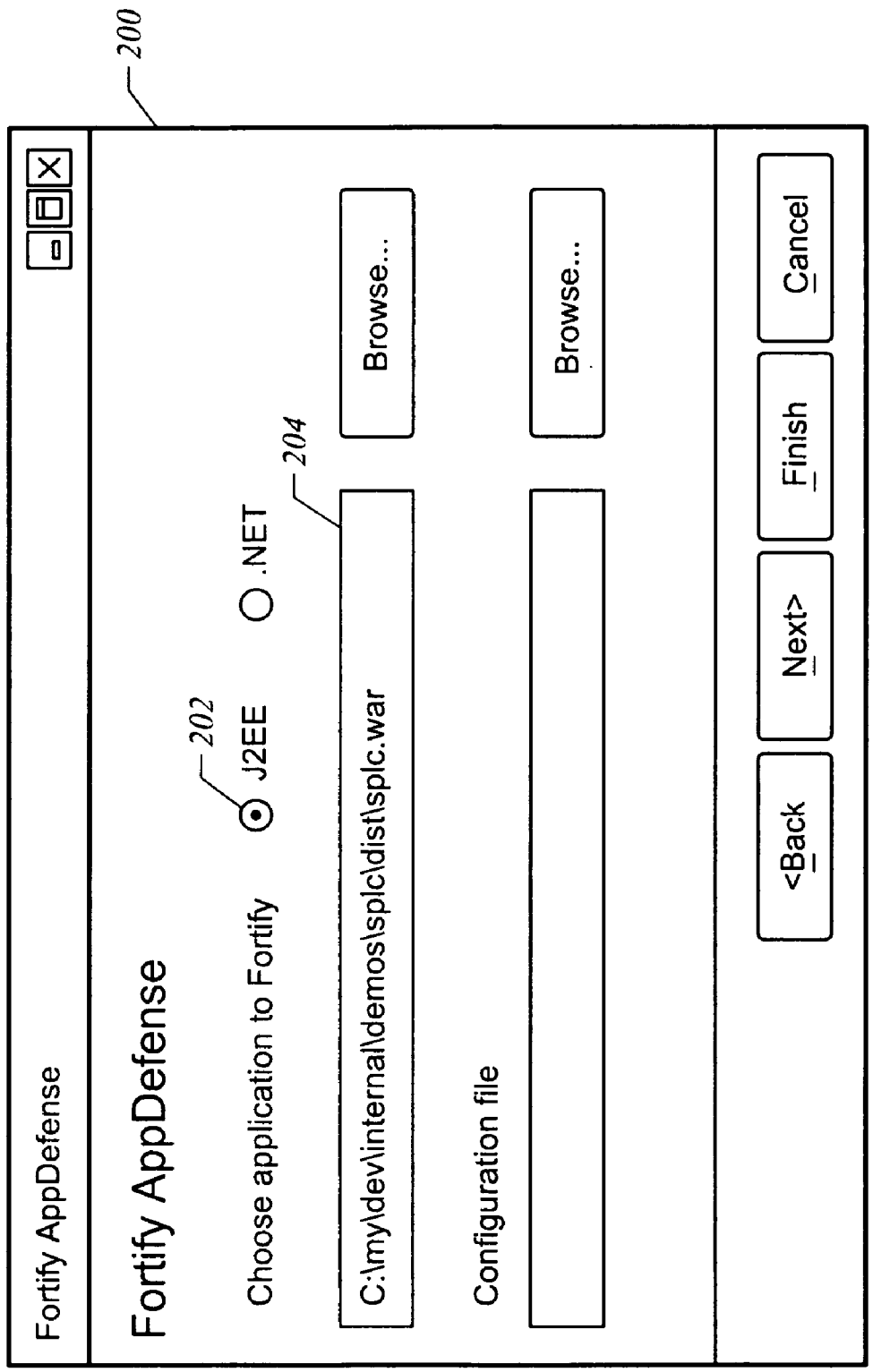
FIG. 2 illustrates a graphical user interface that may be used in accordance with an embodiment of the invention.

FIG. 2 illustrates a graphical user interface 200 used to choose an application to protect. The graphical user interface module 118 may be used to produce this interface. In this example, a user selects a J2EE application to protect using button 202. The file name is then specified in block 204.

FIG. 3 illustrates another graphical user interface 300 that may be used in accordance with an embodiment of the invention. Executable instructions associated with the graphical user interface module 118 may be used to produce this interface. In this example, a variety of guards (e.g., SQL injection, Information Leakage, etc.) may be selected. In addition, various filters (e.g., a white list and a black list) may be selected. Guards and filters may also be set by default without user intervention.

Figure 4:
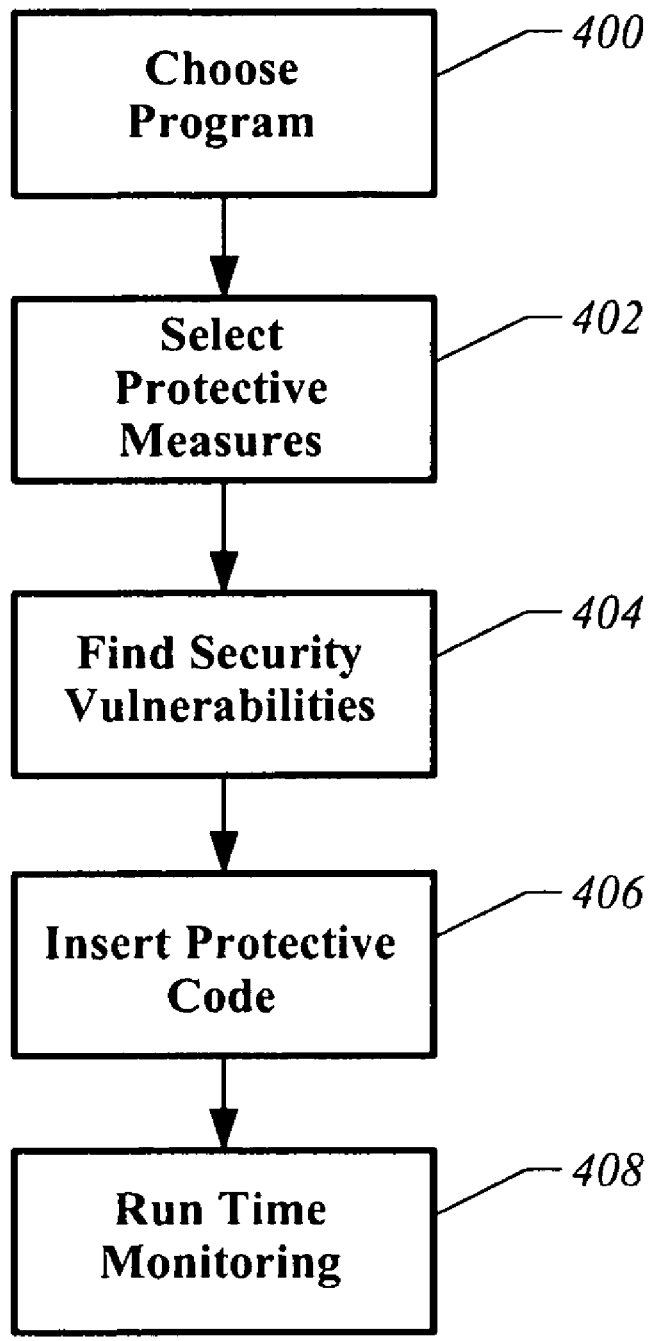
FIG. 4 illustrates processing operations associated with an embodiment of the invention.

FIG. 4 illustrates processing operations associated with an embodiment of the invention. The first operation of FIG. 4 is to choose a program 400. The graphical user interface of FIG. 2 may be used for this purpose. Optionally, protective measures may be selected 402. The graphical user interface of FIG. 3 may be used to implement this function. Alternately, the protective measures may be assigned by default. Security vulnerabilities are then identified within the program 404. The security module 116 may be used to implement this operation. Protective code is then selectively inserted into the compiled program 408 using the security module 116. The compiled program may then operate in a run time mode. In various embodiments, the run time mode logs security behavior, intercepts attacks, and takes defensive measures. These operations may be coordinated by the runtime security module 117.

The security module 116 may use any number of techniques to insert protective code. The insertion of protective source code may be implemented using any number of techniques for automatically supplementing source code. In the case of binary code, there are a number of available tools to decode and alter a binary program. One such tool is the BCEL library. BCEL allows a user to build programs that can analyze and manipulate compiled Java code (i.e., Java bytecode). Another tool for manipulating bytecode is AspectJ. AspectJ uses the BCEL library in order to allow the user to specify locations where code should be inserted in terms that are easy for programmers to learn. This allows the person who is specifying the locations to do so without having to understand bytecode. Further, AspectJ allows the user to specify the code to be inserted in teiiiis of Java source code statements. AspectJ transforms the source code into bytecode prior to inserting it. This is useful because it allows the person writing the modifications to think in terms of source code rather than in terms of compiled code.

Because tools like AspectJ allow programmers to modify compiled code without having to think about the details of what the compiled code looks like, examples are presented in source code form. Even though the program transformations will take place on compiled code in an embodiment of the invention, it is efficient to think in terms of source code and allow a tool like AspectJ to take care of the low-level transformation. Of course, program transformations may also take place within the source code.

Having described the general operations of the invention, attention now turns to specific examples of security vulnerabilities and responsive protective measures utilized in accordance with embodiments of the invention. Consider the problem of SQL injection. SQL Injection is possible when data enters a program from an untrusted source and the data is then used to dynamically construct an SQL query.

The following Java code dynamically constructs and executes an SQL query designed to search for items matching a specified name. The query restricts the items displayed to those where owner is equal to the user name of the currently authenticated user.

```
...
    String userName = ctx.getAuthenticatedUserName( );
    String itemName = request.getParamater("itemName");
    String query =   "SELECT * FROM items WHERE owner = '" +
            userName + "' AND itemname = '" +
            itemName + "'";
    ResultSet rs = stmt.execute(query);
...
```

The query this code intends to execute is the following:

```
SELECT * FROM items
WHERE owner = <userName>
AND itemname = <itemName>;
```

However, because the query is constructed dynamically by concatenating a constant base query string and a user input string, the query only behaves correctly if itemName does not contain a single-quote character. If an attacker with the user name wiley enters the string "name' OR 'a'='a" for itemName, then the query becomes the following:

```
SELECT * FROM items
WHERE owner = 'wiley'
AND itemname = 'name' OR 'a'='a';
```

The addition of the OR 'a'='a' condition causes the where clause to always evaluate to true, so the query becomes logically equivalent to the much simpler query:

```
SELECT * FROM items;
```

This simplification of the query allows the attacker to bypass the requirement that the query only return items owned by the authenticated user; the query now returns all entries stored in the items table, regardless of their specified owner.

As another example, consider the effects of a different malicious value passed to the query constructed and executed in the example above. If an attacker with the user name hacker enters the string "hacker'); DELETE FROM items; - -" for itemName, then the query becomes the following two queries:

```
SELECT * FROM items
WHERE owner = 'hacker'
AND itemname = 'name';
DELETE FROM items;
--'
```

Many database servers, including Microsoft(R) SQL Server 2000, allow multiple SQL statements separated by semicolons to be executed at once. While this attack string would result in an error on Oracle and other database servers that do not allow the batch-execution of statements separated by semicolons, on supported databases this type of attack will allow the execution of arbitrary commands against the database.

Notice the trailing pair of hyphens (- -); these indicate to most database servers that the remainder of the statement is to be treated as a comment and not executed. In this case, the comments are used to remove the trailing single-quote leftover from the modified query. On a database where comments are not allowed to be used in this way, the general attack could still be made effective using a trick similar to the first example. If an attacker enters the string "name'); DELETE FROM items; SELECT * FROM items WHERE 'a'='a" to create the following three valid statements:

```
SELECT * FROM items
WHERE owner = 'hacker'
AND itemname = 'name';
DELETE FROM items;
SELECT * FROM items WHERE 'a'='a';
```

One traditional approach to preventing SQL injection attacks is to treat them as an input validation problem and escape potentially malicious values before they are used in SQL queries. This approach is riddled with loopholes that make it ineffective at preventing SQL injection attacks. Attackers may target fields that are not quoted, find ways of bypassing the need for certain escaped meta-characters, use stored procedures to hide the injected meta-characters, or an array of other possibilities. Escaping characters in input to SQL queries may help, but it will not make an application secure from SQL injection attacks.

Another common solution proposed for dealing with SQL Injection attacks is to use stored procedures. Although stored procedures will help prevent some kinds of SQL injection attacks, they fail to protect against many others. The way stored procedures typically help prevent SQL injection attacks is by placing limitations on the type of statements that can be passed to their parameters. There are plenty of ways around limitations and plenty of interesting statements that can still be passed to stored procedures. Once again, stored procedures might help prevent some exploits, but they will not make an application secure from SQL injection attacks.

The invention utilizes various techniques to defend against SQL Injection attacks. The foregoing SQL security vulnerabilities are first identified by executable instructions associated with the security module 116. The security module 116 then inserts protective code into the program near locations where SQL injection attacks might be possible. The bytecode for the Java source from the first example is modified so that it is equivalent to the following source code:

```
. . .
String userName = ctx.getAuthenticatedUserName( );
String itemName = request.getParamater("itemName");
String query =    "SELECT * FROM items WHERE owner ='" +
                  userName + "' AND itemname ='" +
                  itemName + "'";
com.fortify.appdefense.CheckForSQLInjection(query);
ResultSet rs = stmt.execute(query);
. . .
```

By inserting the call to CheckForSQLInjection( ), before the SQL query is executed, at runtime the program will now give the runtime security module 117 a chance to examine the query string before it is sent to the database. The runtime security module 117 will determine whether the query contains an SQL injection attack by comparing the query against a set of SQL injection attack patterns and considering the history of queries made from this call site, if historical information is available. For example, if the query contains a comment (denoted by the substring "- -") multiple statements (denoted by the semicolon character ";"), or tautological predicates (such as "1=1") when previous queries have not contained comments, multiple statements, or tautological predicates, the query string is likely to be an SQL Injection attack. In one embodiment, the runtime security module 117 includes a standard set of SQL injection attack patterns, and administrators are free to add additional patterns and alter or remove patterns from the standard set.

If the query string contains an SQL Injection attack, the runtime security module 117 invokes the defensive measures specified by the administrator. Defensive measures are discussed below.

Another type of security vulnerability is command injection. Command injection vulnerabilities take two forms:
1. An attacker can change the command that the program executes: the attacker explicitly controls what the command is.
2. An attacker can change the environment in which the command executes: the attacker implicitly controls what the command means.

With the first scenario, command injection vulnerabilities occur when:

1. Data enters the application from an untrusted source.
2. The data is used as or as part of a string representing a command that is executed by the application.
3. By executing the command, the application gives an attacker a privilege or capability that the attacker would not otherwise have.

EXAMPLE 1

The following code from a system utility uses the system property APPHOME to determine the directory in which it is installed and then executes an initialization script based on a relative path from the specified directory.

```
. . .
String home = System.getProperty("APPHOME");
String cmd = home + INITCMD;
java.lang.Runtime.getRuntime( ).exec(cmd);
. . .
```

The code in Example 1 allows an attacker to execute arbitrary commands with the elevated privilege of the application by modifying the system property APPHOME to point to a different path containing a malicious version of INITCMD. Because the program does not validate the value read from the environment, if an attacker can control the value of the system property APPHOME, then they can fool the application into running malicious code and take control of the system.

EXAMPLE 2

The following code is from an administrative web application designed to allow users to kickoff a backup of an Oracle database using a batch-file wrapper around the rman utility and then run a cleanup.bat script to delete some commonly generated temporary files. The script rmanDB.bat accepts a single command line parameter, which specifies what type of backup to perform. Because access to the database is restricted, the application runs the backup as a privileged user.

```
. . .
String btype = request.getParameter("backuptype");
String cmd = new String("cmd.exe /K
\"c:\\util\\rmanDB.bat "+btype+"&&c:\\utl\\cleanup.bat\"")
System.Runtime.getRuntime().exec(cmd);
. . .
```

The problem here is that the program does not do any validation on the backuptype parameter read from the user. Typically the Runtime. exec( ) function will not execute multiple commands, but in this case the program first runs the cmd.exe shell first in order to run multiple commands with a single call to Runtime.exec( ). Once the shell is invoked, it executes multiple commands separated by two ampersands. If an attacker passes a string of the form "&& del c:\\dbms\\*.*", then the application executes this command along with the others specified by the program. Because of the nature of the application, it runs with the privileges necessary to interact with the database, which means whatever command the attacker injects runs with those privileges as well.

Once command injection vulnerabilities are identified by the security module 116, the security module 116 inserts protective code near locations where command injection attacks might be possible. The bytecode for the Java source from Example 1 will be modified so that it is equivalent to the following source code:

```
...
String home = System.getproperty("APPHOME");
String cmd = home + INITCMD;
com.fortify.appdefense.CheckForCmdInjection(cmd);
java.lang.Runtime.getRuntime( ).exec(cmd);
...
```

By inserting the call to CheckForCmdInjection( ), before the command is executed, at runtime the program will now give the runtime security module 117 a chance to examine the command before it is invoked. The runtime security module 117 determines whether the command is malicious by comparing the query against a set of attack patterns and considering the history of commands issued from this call site, if historical information is available. For example, if the command contains references to parent directories (denoted by the substring " . . . ") or multiple subcommands (denoted by a semicolon ";" or "&&") when previous queries have not contained references to parent directories or multiple subcommands, the string is likely to contain a command injection attack. Application defense includes a standard set of command injection attack patterns, and administrators are free to add additional patterns and alter or remove patterns from the standard set.

If the command string does contain a command injection attack, the runtime security module 117 invokes the defensive measures specified by the administrator. Defensive measures are discussed below.

Another security vulnerability processed in accordance with embodiments of the invention is resource injection. A resource injection issue occurs when the following two conditions are met:

1. An attacker is allowed to specify the identifier used to access a system resource. For example, an attacker might be able to specify part of the name of a file to be opened or a port number to be used.
2. By specifying the resource, the attacker gains a capability he would not otherwise have. For example, the program may give the attacker the ability to overwrite the specified file or run with a configuration controlled by the attacker.

EXAMPLE 1

The following code uses input from an HTTP request to create a file name. The author has not considered the possibility that an attacker may provide a file name like ". ./. ./tomcat/conf/server.xml", which will cause the application to delete one of its own configuration files.

```
String rName = request.getParameter("reportName");
File rFile = new File("/usr/local/apfr/reports/" + rName);
...
rFile.delete( );
```

EXAMPLE 2

The following code uses input from a configuration file to determine which file to open and echo back to the user. If the program runs with privileges and malicious users can change the configuration file, they can use the program to read any file on the system that ends with the extension ".txt".

```
fis = new FileInputStream(cfg.getProperty("sub")+".txt");
amt = fis.read(arr);
out.println(arr);
```

The kind of resource the data affects indicates the kind of content that may be dangerous. For example, input that is allowed to contain filesystem special characters like period, slash, and backslash warrants attention when it can reach methods that interact with the file system; similarly, data that may hold URLs and URIs are a risk for functions used to create remote connections. One special case of resource injection, known as Path Manipulation, occurs when an attacker is able to control file system resources on a Web server.

Similar to the defense against SQL Injection and Command Injection, the security module 116 inserts code near locations where resource injection attacks might be possible. The bytecode for the Java source from Example 1 will be modified so that it is equivalent to the following source code:

```
String rName = request.getParameter("reportName");
com.fortify.appdefense.CheckForRsrcInjection(cmd);
File rFile = new File("/usr/local/apfr/reports/" + rName);
...
rFile.delete( );
```

By inserting the call to CheckForRsrcInjection( ), before the resource access occurs, at runtime the program will now give the runtime security module 117 a chance to examine the resource name before it is used. The runtime security module 117 determines whether the resource name is malicious by comparing the resource name against a set of attack patterns and considering the history of resources accessed from this call site, if historical information is available. For example, if the resource name contains references to parent directories (denoted by the substring " . . . ") when previous queries have not contained references to parent directories, the string may be a command injection attack. The runtime security module 117 includes a standard set of command injection attack patterns, and administrators are free to add additional patterns and alter or remove patterns from the standard set.

If the resource string does contain an injection attack, the runtime security module 117 invokes the defensive measures specified by the administrator. Defensive measures are discussed below.

Another security vulnerability processed in accordance with the invention is log forging. Log forging vulnerabilities occur when:

1. Data enters an application from an untrusted source.
2. The data is written to an application or system log file.

Applications typically use log files to store a history of events or transactions for later review, statistics gathering, or debugging. Depending on the nature of the application, the task of reviewing log files may be performed manually on an as-needed basis, or it may be automated with a tool that automatically culls logs for important information or trend information.

An examination of the log files may be hindered or misdirected if an attacker can supply data to the application that is subsequently logged verbatim. In the most benign case, an attacker may be able to insert false entries into the log file by including the appropriate characters in the data provided. If the log file is processed in an automated fashion, the attacker may be able to render the file unusable by corrupting the format of the file or injecting unexpected characters. A more subtle attack could involve skewing the log file statistics. Forged or otherwise corrupted log files may be used to cover an attacker's tracks or even to implicate another party in the commission of a malicious act. In the worst case, an attacker may inject code or other commands into the log file and take advantage of a vulnerability in the log processing utility.

EXAMPLE

The following code from a web application attempts to read an integer value from a request object. If the value fails to parse as an integer, then the input is logged along with an error message indicating what happened.

```
...
String val = request.getParameter("val");
try {
    int value = Integer.parseInt(val);
}
catch (NumberFormatException) {
    log.info("Failed to parse val = " + val);
}
...
```

If a user submits the string "twenty-one" for val, the following entry is logged:

```
INFO: Failed to parse val=twenty-one
```

However, if an attacker submits the string "twenty-one % 0a % 0aINFO:+User+logged+out % 3dbadguy", the following entry is logged:

```
INFO: Failed to parse val=twenty-one
INFO: User logged out=badguy
```

Clearly, the attacker can use this same mechanism to insert arbitrary log entries.

In accordance with an embodiment of the invention, the security module 116 inserts code near locations where log forging attacks might be possible. The bytecode for the Java source from the example above is modified so that it is equivalent to the following source code:

```
...
String val = request.getParameter("val");
try {
    int value = Integer.parseInt(val);
}
catch (NumberFormatException) {
    com.fortify.appdefense.CheckForLogForging(val);
    log.info("Failed to parse val = " + val);
}
...
```

By inserting the call to CheckForLogForging( ), before the log file entry is written, at runtime the program will now give the runtime security module 117 a chance to examine the data before it is written to the log. The runtime security module 117 determines whether the data is malicious by comparing it against a set of attack patterns and considering the history of log entries written from this call site, if historical information is available. For example, if the data contains carriage returns or line feeds (characters that are typically used to denote the beginning of a new log file entry) when previous queries have not contained these characters, the string may be an attempt at log forging. The runtime security module 117 includes a standard set of log forging attack patterns, and administrators are free to add additional patterns and alter or remove patterns from the standard set.

If the data does contain a log forging attack, the runtime security module 117 invokes the defensive measures specified by the administrator. Defensive measures are discussed below.

An embodiment of the invention protects against buffer overflows. If an attacker can cause a target program to write outside the bounds of a block of allocated memory, the program may corrupt its own data, crash, or execute malicious code on behalf of the attacker. Languages like Java and C# have built-in features like array bounds checking and strong type checking that prevent buffer overflow, but these safeguards do not prevent attackers from using these programs in order to deliver a buffer overflow attack to vulnerable back-end software.

Languages like Java and C# are often used to write front-end interfaces for older systems written in older languages like C or Cobol. For example, a brokerage entity is likely to have a web site that allows users to conduct stock trades. The software that generates the web pages might be written in Java while the trading software is written in C. In this scenario, the Java front-end is responsible for communicating trade information to the back-end system. If the back-end trading system contains a buffer overflow vulnerability, it may be possible for an attacker to exploit the vulnerability by providing the attack data to the Java front-end and causing the Java code to pass the attack on to the vulnerable back-end system.

Method #1: Input Length Restriction

Buffer overflow attacks often require the attacker to provide an unusually large amount of data. The runtime security module 117 inspects each HTTP request as it is received by the program and checks to make sure that the contents of the request are not overly large. The request data includes the URL, query string, HTTP headers (including cookies), parameter names and values, and multi-part form data. The administrator can configure a size limit for each part of the request and can specify different size limits depending on the URL requested, the name of the HTTP header or parameter, or upon a combination of these factors.

The security module 116 allows the runtime security module 117 to inspect the request before it is visible to the application. The security module 116 does this by modifying the program configuration. For J2EE applications, this is accomplished by modifying the application deployment descriptor. (See Appendix A for an example of a deployment descriptor before and after modification by the security module 116.)

If the runtime security module 117 determines that a request contains data that exceeds the specified length limits, it invokes the defensive measures given by the administrator. Defensive measures are discussed below.

Method #2: Detecting a Buffer Overflow Sled

In order to take advantage of a buffer overflow in order to execute malicious code, an attacker must carefully structure the input they send to the target program. If the buffer overflow allows the attacker to write data onto the stack, then the attacker can specify a new value for the function return pointer. (The function return pointer specifies a memory address that the program will jump to and begin executing instructions when the current function ends). If the attacker specifies an address on the stack where their input buffer containing malicious code has been written, then the program will proceed to execute the malicious code.

For the attacker, the hardest part of carrying out this attack is knowing the memory address to specify for the function return pointer. Because they cannot know the precise state of the stack before the attack is launched, they cannot know with 100% accuracy where their malicious code will be written in memory. If the address they specify is not completely accurate, some or all of the malicious code will be skipped. This is undesirable from the attacker's point of view: if the computer begins executing in the middle of the malicious code, then it is unlikely that the attack will have its intended effect.

The purpose of a buffer overflow sled (sometimes also referred to as a "slide") is to reduce the precision required for a successful buffer overflow attack. The sled is a long and repetitive sequence of simple instructions that the computer can execute beginning at any point. By appending a sled to the beginning of their malicious code, the attacker now has an easier objective: if they specify a function return pointer that points to any memory address in the sled, the computer will execute whatever portion of the sled it encounters, then execute all of the malicious code. The longer the sled is, the more robust the resulting attack will be. The simplest possible sled is a sequence of no-op instructions. More complex sleds may also include jump instructions or other simple operations.

The runtime security module 117 can detect buffer overflow attacks by detecting the buffer overflow sled. By monitoring locations where the application may be vulnerable, such as calls out to external programs or functions that are implemented in native code, the runtime security module 117 can look for long sequences of no-op instructions or other common sled contents. For example, a program that contains the following call:

```
native_method_call(input);
``` will be transformed to contain an additional check:

```
com.fortify.appdefense.CheckForOverflowSled(input);
native_method_call(input);
```

If the runtime security module 117 determines that a potentially vulnerable call is about to receive input that contains a buffer overflow sled, it will invoke defensive measures as specified by the administrator. Defensive measures are discussed below.

Embodiments of the invention also address cross site scripting and HTTP response splitting. Cross-Site Scripting (XSS) vulnerabilities occur when:
1. Data enters a web application through an untrusted source, most frequently a web request.
2. The data is included in dynamic content that is sent to a web user without being validated for malicious code.

The malicious content sent to the web browser often takes the form of a segment of JavaScript, but may also include HTML, HTTP, Flash or any other type of code that may be executed by the browser.

HTTP response splitting is the name for a special class of Cross-Site Scripting that takes place when unvalidated content sent to a web user in an HTTP header contains an unescaped carriage return (or carriage return/line feed combination) followed by an HTTP response crafted by the attacker. The carriage return causes the user's browser to interpret the data that follows as a new HTTP response. This behavior gives the attacker complete control of the information displayed in the browser.

EXAMPLE 1

The following JSP code segment reads an employee ID number from the HttpServletRequest and prints it out to the user.

```
<% String eidid = req.getParameter("eid"); %>
...
Employee ID: <%= eid %>
```

The code in Example 1 behaves correctly if eid contains only standard alpha-numeric text. But if eid contains meta-characters or source code, then an attacker can execute malicious commands in the web browser of any user who views content that includes its value. At first glance it is temping to ask: "The user who made the request is also viewing the resulting data—why would they attack themselves?" Avoid the temptation to label this code benign for this reason. A common attack is to convince a victim to visit a malicious URL via email or other means, which will cause the victim to unwittingly reflect malicious content off of a vulnerable web application and execute it locally, oftentimes in the form of a segment of JavaScript. This mechanism of exploiting vulnerable web applications is known as Reflected Cross-Site Scripting.

EXAMPLE 2

The following JSP code segment queries a database for an employee with a given employee ID and then prints the name corresponding with the ID.

```
<%                                    ...
    Statement stmt = conn.createStatement( );
    ResultSet rs = stmt.executeQuery("select * from emp where
id="+eid);
    if (rs != null) {
        rs.next( );
        String name = rs.getString("name");
%>
Employee Name: <%= name %>
```

As in Example 1, the code in Example 2 behaves correctly when values of name are well mannered, but does nothing to prevent exploits in the event that they are not. In contrast with Example 1, we may be even less likely to consider the code dangerous because the value of name is read from a database, whose contents the application manages. The vulnerability here is not a result of the data being read from the database, but rather, is caused by the original source of the data stored in the database. If the value of name originated from user supplied data, then the database simply serves as a conduit for dangerous data. Without proper input validation on all data stored in the database, an attacker may be able to execute malicious commands in the user's Web browser. This flavor of exploit, known as Stored Cross-Site Scripting, is particularly insidious because the indirection caused by the data store makes them more difficult to identify and increases the likelihood that the attack will affect multiple users.

Cross-Site Scripting vulnerabilities are caused by the inclusion of unvalidated data in dynamic content displayed to the user. There are three typical vectors for dangerous data to make its way to the user:

1. As in Example 1, data is read directly from an untrusted source, most frequently a web request, and included in dynamic content.
2. As in Example 2, the application stores dangerous data in a database or other trusted data store. The dangerous data is subsequently read back into the application and included in dynamic content.
3. A source outside the current application stores dangerous data in a database or other data store, and again the dangerous data is subsequently read back into the application as trusted data and included in dynamic content.

Reflected XSS exploits occur when an attacker causes a user to supply dangerous content to a vulnerable web application, which is then reflected back to the user and executed by the web browser. The most common mechanism for delivering the malicious content is to include it as a parameter in a URL that is posted publicly or emailed directly to users. URLs constructed in this manner are at the heart of many phishing schemes where an attacker convinces victims to visit a URL that refers to a vulnerable site. When the site reflects the attackers content back to the user it then proceeds to transfer private information, such as cookies, from the user's machine to the attacker or perform other nefarious activities.

Stored XSS exploits occur when an attacker gets dangerous content into a database or other data store that is later read and included in dynamic content viewed by a user. From an attacker's perspective, the most desirable place to inject malicious content is in an area that is displayed to either many users or interesting users. Interesting users are likely to have elevated privilege in the application or interact with sensitive data that is valuable to the attacker. If one of these users executes malicious content, the attacker may be able to perform privileged operations on behalf of the user or gain access to sensitive data belonging to the user.

The security module 116 inserts code near locations where a Cross-Site Scripting payload could be written out to an HTTP response (in either the body or a header). The bytecode for the Java source from Example 1 will be modified so that it is equivalent to the following JSP source code:

```
<% String eidid = req.getParameter("eid"); %>
...
Employee ID: <%
   com.fortify.appdefense.CheckForXss(cmd);
   out.print(eid) %>
```

By inserting the call to CheckForXss( ), before the string is written to the output stream, at runtime the program will now give the runtime security module 117 a chance to examine the data before it is sent back to the user. By interceding at the last possible point before the data is written back to the user, the runtime security module 117 can detect Cross-Site Scripting regardless of whether it is of the reflected or stored variety. The runtime security module 117 can also check for Cross-Site Scripting attack patterns as the data is read out of an HTTP request, or database, or from another data store.

The runtime security module 117 determines whether a piece of data contains a Cross-Site Scripting attack by comparing it against a set of attack patterns and considering the history of data written out from the call site in question, if historical information is available. For example, if the data contains script tags (denoted by the substring "<script>") when previous queries have not contained script tags, the string may be a cross site scripting attack. The runtime security module 117 includes a standard set of cross site scripting attack patterns, and administrators are free to add additional patterns and alter or remove patterns from the standard set.

If the string does contain a cross-site scripting attack, the runtime security module 117 invokes the defensive measures specified by the administrator. Defensive measures are discussed below.

Site defacement is another problem addressed with embodiments of the invention. If an attacker finds a way to damage or alter the program files for a server-based application, legitimate users of the application may be misled, inconvenienced, or defrauded. The attacker might change the contents of a web page, add a new and unauthorized web page, or alter the logic of the application itself. Attackers have many possible avenues for altering the application. They may be able to exploit a vulnerability in the application itself, or they may take advantage of a weakness in the underlying application server, operating system, or network. They may also be able to bribe, corrupt, or trick system administrators into making the changes.

In addition to changes that are made with malicious intent, program files may be updated by developers or administrators who are well intentioned, but ignorant of the organization change control process. Well-intentioned but misguided alterations can be just as damaging as malicious alterations.

Because there are so many ways that site defacement can occur that are out of the control of the program, the invention does not attempt to prevent site defacement. Instead, it focuses on detecting when site defacement has occurred so that the program can take defensive action.

The runtime security module 117 detects site defacement in the following way: After the security module 116 inserts code into the program but before the program is run, the security module 116 creates a manifest that lists the name, size, and a secure hash of each file that comprises the application. (The secure hash is computed using an algorithm like MD5 or SHA.) Then, when the program is running, the runtime security module 117 periodically checks the contents of the manifest against the application files present on the computer. If files have been added, deleted, or modified, the runtime security module 117 knows that a Site Defacement attack may have taken place.

Site probing is another problem addressed with embodiments of the invention. Before attackers can launch successful targeted attacks against a program, they need to explore the program in order to learn about its potential weaknesses. This exploration usually involves probing the program in ways that a normal user would not. For example, an attacker may probe for outdated web pages, backup files, and administrative web pages by making requests for URLs that are not referenced from the application's user-visible web pages. The attacker might also alter URL parameters, HTTP headers, and POST parameters in an effort to discover vulnerabilities.

The invention can protect against site probing in two ways:
1. By monitoring the HTTP errors that users generate, the runtime security module 117 determines when a user is generating an unusual number of errors. For example, HTTP 404 errors indicate that the user requested a page that does not exist in the application. Most users generate either no errors at all, or a very small number. Attackers will generate long sequences of errors. The security module 116 makes it possible for the runtime security module 117 to gain access to information about user generated errors by modifying the application deployment descriptor. (See Appendix A for an example of a deployment descriptor before and after modification by the security module 116.)

2. By modifying the HTTP responses that the application generates, the security module can bait attackers into probing the application in ways that reveal their malicious intent. For example, the security module can add a cookie to the HTTP response. The cookie has no meaning to the application, and regular users of the application will not be aware of the cookie and will not have an opportunity (or a motivation) to change its value. An attacker, on the other hand, may believe that altering the cookie could be advantageous to them. When the security module sees an altered cookie value, it knows that the application is being probed and can take defensive action. The security module 116 makes it possible for the runtime security module 117 to modify the HTTP response by modifying the application deployment descriptor. (See Appendix A for an example of a deployment descriptor before and after modification by the security module 116.)

Session ID guessing security vulnerabilities are also identified in accordance with an embodiment of the invention. Many web-based applications have a login page where the user provides a username and a password (or other authentication credentials). After the user successfully authenticates with the application, he or she is allowed to use the application for some period of time without authenticating again. The application achieves this by associating a session identifier with the user. The session identifier is typically stored as a cookie on the user's browser. After authentication, every time the user makes a request to the application, the cookie containing the session identifier is sent to the application and the application verifies that the session identifier corresponds to a correctly authenticated user.

If an attacker can guess the session identifier for an authenticated user, the attacker can begin making requests using that session identifier; by guessing the session identifier they can essentially take over the user's session. The application will see that the session identifier corresponds to an authenticated user and will happily grant the attacker access to anything that the true user has access to. For this reason, it is important for session identifiers to be hard to guess. In a typical attack, the attacker will have to make a large number of guesses before finding a valid session identifier.

The runtime security module 117 defends against session identifier guessing by looking for large bursts of requests that all use invalid session identifiers. This burst of requests is likely to represent an attack, especially if a large number of them come from the same IP address. The security module 116 makes it possible for the runtime security module 117 to monitor all HTTP requests (both those with valid session identifiers and those with invalid session identifiers) by modifying the application deployment descriptor. (See Appendix A for an example of a deployment descriptor before and after modification by the security module 116.)

Forceful browsing is another security vulnerability identified in accordance with embodiments of the invention. Many interactions with a web-based application take place over a series of web pages. For example, a user may add items to a shopping cart on one page, fill in their name and address on the next page, and complete their checkout by specifying a credit card number on the final page. Forceful browsing is the term used to refer to attacks where the attacker subverts the normal flow of the application. For example, if the application computes the amount of tax due on the order after the address page is filled out, the attacker may be able to submit a tax-free order by bypassing the name and address page. Well-written applications will contain very few, if any, vulnerabilities of this sort, so an attacker will likely need to try many combinations and sequences of pages in order to identify a vulnerability.

The runtime security module 117 can protect against forceful browsing attacks in three ways. In each of the three ways, the security module 116 makes it possible for the runtime security module 117 to monitor the headers and other portions of all HTTP requets by modifying the application deployment descriptor. (See Appendix A for an example of a deployment descriptor before and after modification by the security module 116.):

1. The "referrer" header in an HTTP request gives the name of the page that led the user to make the current request. In the normal flow of the application, this header should always be set to the correct preceding page in the application flow. The runtime security module 117 looks for referrer headers that are incorrect based on the current page being requested. Note that it is possible for an attacker to forge the referrer header. Less sophisticated attackers will not do this, but this protection will not succeed against more astute attackers.

2. Another technique typically applied by less sophisticated attackers is to make their Forceful browsing requests using a different HTTP method than the application would normally use. In most circumstances, when a user fills out a form on a web page and submits it, the request is sent to the server using an HTTP POST request. If an attacker attempts to jump directly to a particular part of the application by altering the URL in their browser window, the information will be sent to the server as an HTTP GET request. The runtime security module 117 can keep track of which method is normally used to access a page, then report discrepancies from this pattern as attempts at forceful browsing.

3. Forceful browsing is likely to cause an unusual number of application errors as the program attempts to fulfill the user's out-of-order requests. Because the attacker is likely to try multiple sequences of requests before finding a vulnerability, the application will encounter a large number of errors. By tracking the number of errors that a user generates, the runtime security module 117 detects potential attempts at forceful browsing.

Embodiments of the invention also address Credential Guessing and Registration Guessing. A network-based application typically requires users to authenticate themselves before they are allowed to view or modify sensitive information. The most common form of authentication in use today is the username/password combination. If an attacker can guess both the username and the password for a legitimate user, the attacker can impersonate the user.

If attackers are allowed to make an unlimited number of username/password guesses, they will eventually gain access to the system. Some applications limit the number of consecutive authentication attempts that can be made for a single username. For example, an application might limit a user to five consecutive unsuccessful login attempts before the user must contact customer support. (Generally speaking, this type of defensive measure is unacceptable in systems that must maintain a high level of availability for reasons explained below.)

But if an attacker is more interested in having any account on a system rather than in having a specific account on a system, then this limitation does little to hamper an attack on the authentication system. The attacker can simply guess different username/password combinations and never try the same username more than four times.

Alternatively, an attacker may use the application's defensive behavior in order to deny access to legitimate users. Continuing the example above, by repeatedly guessing bad passwords for a large number of accounts, the attacker is able to prevent users from accessing the application until they have contacted customer support. (In addition to inconveniencing users, this may place a heavy burden on customer support.)

Another form of attack, registration guessing, allows an attacker to collect a list of legitimate usernames from a system that allows users to self-register. Take, for example, a web-based email service. If the service allows people to sign up for a free trial account, it will ask a new user to pick an email address as part of the registration process. If the new user picks an email address already taken by another user, the system will ask the new user to pick a different address. This behavior is valuable to an attacker: if the system tells them that a particular email address is already taken, then they know that the username belongs to someone already registered with the system. By guessing a large number of addresses, the attacker can build up a list of legitimate account names. The attacker may then use this list as part of a different attack, such as phishing or password guessing.

The runtime security module 117 defends against credential guessing by looking for large bursts of authentication requests that all fail. Similarly, the invention defends against registration guessing attacks by looking for long sequences of registration attempts that are not completed or that generate collisions with existing users. These bursts of requests are likely to represent an attack, especially if a large number of them come from the same IP address. The security module 116 makes it possible for the runtime security module 117 to monitor failed authentication requests and failed registration requests by inserting code into the executable that notifies the runtime security module 117 when a call to the authentication function or a call to the registration function has failed.

Error Mining is another vulnerability addressed with embodiments of the invention. When an attacker explores a web site looking for vulnerabilities, the amount of information that the site provides back to the attacker is crucial to the eventual success or failure of the attack. If the application shows the attacker a stack trace, it gives up information that makes the attacker's job significantly easier. For example, a stack trace might show the attacker a malformed SQL query string, the type of database being used, and the version of the application container. This information enables the attacker to target known vulnerabilities in these components.

The application configuration should guarantee that the application can never leak error messages to an attacker by specifying a default error page. Handling standard HTTP error codes is a useful and user-friendly thing to do, but a good configuration will define a last-chance error handler that catches any exception that could possibly be thrown by the application.

The runtime security module 117 protects against error mining by acting as a top-level error catcher. The security module 116 enables the runtime security module 117 to act as a top-level error catcher by modifying the application deployment descriptor. (See Appendix A for an example of a deployment descriptor before and after modification by the security module 116.) Any errors that the application does not handle itself will be handled by the runtime security module 117, thereby preventing the application container's default error response mechanism from ever displaying sensitive system information to an attacker. The runtime security module 117 handles any errors it receives by presenting an error page that does not reveal sensitive information. This error page can be customized by the administrator.

Sensitive Data Extraction is another issue addressed by embodiments of the invention. A system information leak occurs when system data or debugging information leaves the program through an output stream or logging function.

EXAMPLE

The following code prints an exception to the standard error stream:

```
try {
    ...
} catch (Exception e) {
    e.printStackTrace( );
}
```

Depending on the system configuration, this information might be displayed to a terminal window, written to a log file, or exposed to a remote user. In some cases the error message can tell the attacker precisely what sort of an attack the system will be vulnerable to. For example, a database error message might reveal that the application is vulnerable to an SQL injection attack. Other error messages may reveal more oblique clues about the system. Showing a classpath to a user could imply information about the type of operating system, the applications installed on the system, and the amount of care that the administrators have put into configuring the program.

The runtime security module 117 protects against sensitive data extraction by monitoring the information that the application emits. By searching for patterns in the data being written out, the security module determines when and where sensitive data is leaving the system. For example, a stack trace has a distinctive appearance:

```
java.io.FileNotFoundException:          secret.txt
    at    java.io.FileInputStream.<init>(FileInputStream.java)
    at    java.io.FileInputStream.<init>(FileInputStream.java)
    at    SecretXfer.readFile(SecretXfer.java:41)
    at SecretXfer.main(SecretXfer.java:87)
```

This approach is termed "blacklisting" because it involves creating a negative pattern set: a set of patterns that represent data that the application should not expose.

If the runtime security module 117 sees information of this form leaving the application, it can respond by preventing the information from being written out, altering the information so that it is no longer sensitive, or simply altering the administrator that sensitive data is leaving the system. The security module 116 enables the runtime security module 117 to filter all outbound HTTP response data by modifying the application deployment descriptor. (See Appendix A for an example of a deployment descriptor before and after modification by the security module 116.)

Another issue to consider is Privacy Violation. Privacy violations occur when:
1. Private user information such as a credit card number, password, or social security number, enters the program.
2. The data is written to an external resource, such as the console, filesystem, or network.

EXAMPLE

The following code contains a logging statement designed to track the contents of records that are added to a database by storing them in a log file. Among other values that are stored, the getPassword( ) function returns the user-supplied plaintext password associated with the account.

```
pass = getPassword( );
...
dbmsLog.println(id+":"+pass+":"+type+":"+tstamp);
```

The code in the example above logs a plaintext password to the filesystem. Although many developers trust the filesystem as a safe storage location for data, it should not be trusted implicitly, particularly when privacy is a concern.

Private data can enter a program in a variety of ways. It may originate directly from the user in the form of a password or personal information. It may be accessed from a database or other data store where it is held until needed by the application. It may arrive indirectly from a partner or other third party. Sometimes data that is not necessarily labeled as private can carry an additional private meaning. For example, student identification numbers are often not considered private because there is generally not a publicly available mapping back to an individual student's personal information. However, if a school decided to generate their identification numbers based upon student social security numbers, then the numbers would have to be treated as private.

It is not uncommon for security and privacy concerns to apparently compete with one another. From a security perspective it is often advisable to record important operations that occur so that any anomalous activity can later be identified. However, when private data makes its way into these operations this otherwise well-intentioned practice can in fact become a risk.

Although private data can be handled unsafely for a variety of reasons, one of the most common is misplaced trust. Developers often consider the operating environment where a program runs to be partially if not completely trusted. Because of this a programmer may not think twice about storing private information on the filesystem, in the registry or to other locally controlled resources. However, the fact that certain resources are not accessible to arbitrary users does not guarantee that the individuals that do have access to them can be entirely trusted, particularly with potentially valuable private data. In 2004 AOL suffered from the wrong employee getting his hands on private customer information when he sold approximately 92 million AOL customer email addresses to a spammer marketing an offshore gambling website.

In response to high-profile exploits like the one suffered by AOL, the collection and management of private data is becoming an increasingly regulated undertaking. Depending on its location, the type of business it conducts and the nature of any private data it handles, an organization may find itself under the purview of one or more of the following federal and state regulations: Safe Harbor Privacy Framework, Gramm-Leach Bliley Act (GLBA), Health Insurance Portability and Accountability Act (HIPAA), and California SB-1386. Despite an abundance of regulation, privacy violations continue to occur with alarming frequency.

Similar to the protection against sensitive data extraction, the runtime security module 117 protects against privacy violations by monitoring the information that the application emits and comparing it a set of patterns (a blacklist) that represent private information that the application should not expose. For example, the security module 117 might look for the pattern ddd-dd-dddd (where the letter "d" stands for any digit) in order to identify that the application is writing out social security numbers. The security module 116 enables the runtime security module 117 to filter all outbound HTTP response data by modifying the application deployment descriptor. (See Appendix A for an example of a deployment descriptor before and after modification by the security module 116.)

Click fraud is another vulnerability addressed with embodiments of the invention. Advertising on the internet is big business. Of course, instead of billboards, magazine pages, and television channels, ads are carried on web pages. Under one common arrangement, advertisers compensate the owners of the web pages based on the number of people who click on a link in the advertisement. This arrangement brings with it the potential for fraud: a web site owner could repeatedly click the links on their own web page in order to increase their advertising profits. Similarly, an attacker who wanted to cause havoc could run up a company's advertising costs by setting up a program to generate clicks. These practices are known as click fraud.

The runtime security module 117 helps detect click fraud by tracking URL requests. By examining the history of requests for a particular URL and the timing and other details about those requests, the security module 116 points out sets of requests that are suspect. For example, one definition of suspect requests might be identified by a sharp increase in the frequency of requests for a particular URL a majority of the requests come from a small number of IP addresses the HTTP headers, such as the browser string, are identical The security module 116 enables the runtime security module 117 to collect statistics related to URL requests by modifying the application deployment descriptor. (See Appendix A for an example of a deployment descriptor before and after modification by the security module 116.)

Unauthorized access is another security vulnerability that may be addressed in accordance with an embodiment of the invention. Regardless of the security measures taken by an application, it is always possible for users to lose control of their authentication credentials. Users may fall for a scam e-mail message (this approach is called phishing), fall prey to a DNS server that has been compromised by an attacker (called pharming), write down their username and password and store it in an unsafe location, or accidentally install a spyware program that logs all of their keystrokes and transmits them to an attacker.

The runtime security module 117 can detect abnormal account activity that may indicate that a user's authentication credentials have been stolen. The runtime security module 117 takes three approaches to detecting abnormal account activity:

1. Create a model of the user's behavior and identify situations where the observed behavior deviates from the model. The runtime security module 117 creates a model of the types of requests that each user makes, then, if the types of requests that a user makes suddenly and significantly deviates from the model, then the security module flags the abnormal account activity. Similarly, by using JavaScript, an Applet, or an ActiveX control, the security module monitors the small amount of time that a user pauses between keystrokes when they type into the application's web page fields (the username and password field, for example). This inter-key timing information can be used to build a model of the user's typing. The runtime security module 117 flags significant changes in the way a user types, since a large change may indicate that someone other than the real user is typing.

2. Track activity across accounts and look for abnormally similar behavior between accounts. If an attackers harvest authentication credentials from a large number of accounts, they may set up a script to perform the same action across all of the accounts. For example, a spammer may use a large number of compromised accounts on a web-based email service to send spam. The security module can be configured so that it detects that large number of users are all sending the same e-mail message.

3. Keep track of activity from previous account compromises and flag behavior that matches those compromises. This requires the administrator to identify to the security module the system activity related to compromised account access.

The runtime security module 117 may also be configured to address the issue of anonymous access. An IP address is an identifier used to route packets on the internet. Under normal circumstances, when a web browser makes a request to retrieve a page from a web site, the web site's name is translated into an IP address, then the request is routed to the web server with that IP address. The web server responds by sending the page back to the IP address of the computer that originated the request. In this way, an IP address serves to identify a computer on the Internet.

In some situations, computer users may wish to be anonymous. Examples include:

A dissident group may think it is undesirable for the government to know about the set of web sites they are visiting.

A criminal may wish to probe a web site for vulnerabilities without revealing any identifying information.

In order to be anonymous, a user must find a way to have packets routed back to their computer without revealing their true IP address. A protocol for achieving this goal is called an anonymous routing protocol. Onion Routing is probably the most popular anonymous routing protocol, and the most popular implementation of Onion Routing is called "TOR".

The administrators for a web application may or may not wish to handle traffic from anonymous users. Some anonymous routing implementations, TOR, for example, make it possible, but non-trivial, to distinguish between normal and anonymous HTTP requests.

The runtime security module 117 allows an application to change its behavior based on whether or not an HTTP request comes through TOR. It does this by comparing the IP address that the request appears to originate from to a list of TOR "exit servers". In this way, a system using the runtime security module 117 is able to deny access to anonymous users, limit the actions that anonymous users are allowed to take, or change the thresholds the security module uses to distinguish between normal use and potential attacks. For example, a regular user may be able to send requests with parameters that are up to 1000 characters in length while anonymous users are restricted to 100 character parameters.

The runtime security module 117 may also be configured to address Publicly Available Attack tools. Less sophisticated attackers may use pre-existing tools to probe a web application for vulnerabilities. Such tools include WVS (Web Vulnerability Scanner) from Acunetix, RedTeam Workbench from Fortify Software, or AppScan from SPI Dynamics. These tools are capable of finding web application vulnerabilities such as cross-site scripting or buffer overflow. By providing an easy to use interface, these tools automate the repetitive task of looking for vulnerabilities across a large number of web pages and parameters on those pages. The tools also make it possible for a person with malicious intent but little knowledge to create an effective attack.

The runtime security module 117 can detect attacks that originate from some types of automated attack tools. Some of these tools are meant to be used by application testers in order to find vulnerabilities before attackers do. These tools generate a distinct signature in the HTTP requests that they generate in order to make it easy for anyone looking at the traffic to understand where the requests come from. Other tools leave more subtle clues. WVS generates cross-site scripting attacks that include the string "WVS_" in them. AppScan generates a buffer overflow attack that consists of fifty 'a' characters.

By looking for application signatures or more subtle clues in HTTP requests made to the application and blocking or otherwise defusing them, the runtime security module 117 makes it impossible for an attacker to use a publicly available attack tool to find vulnerabilities in an application. The security module 116 enables the runtime security module 117 to examine HTTP requests to match against characteristics of known attack tools by modifying the application deployment descriptor. (See Appendix A for an example of a deployment descriptor before and after modification by the security module 116.)

As discussed earlier, the security of a web-based application is dependent upon the attacker not being able to learn the session identifier of a legitimate user. If the attacker can guess a valid session identifier, they can simply take over the user's session. Of course good session identifiers are long and completely random, so they're hard to guess.

Rather than guessing, an attacker may trick a user into using a particular session identifier that the attacker specifies. The result is the same as if the attacker had guessed the session identifier: the attacker can now take control of the user's session. This attack is known as "session fixation".

Here is one scenario by which an attacker could force a user to have a particular session identifier: Some Servlet containers, notably Tomcat, allow session identifiers to be passed in two ways:

1) as a cookie;
2) as a URL parameter.

Most modern applications only use cookies. There is a good security motivation for this decision: passing a session identifier as a URL parameter may cause the value to be logged, written to the browser history, or otherwise exposed to an attacker. If Tomcat is configured to pass the session identifier as a cookie and it sees a session identifier passed as a URL parameter, it will take the parameter value and transfer it to a cookie.

This transfer mechanism gives an attacker an opportunity to force a session identifier on their victim. The session identifier cookie or parameter is traditionally named "jsessionid". If an attacker sends the victim an email message or other communication that contains a link like this: http://www.vulnerablesite.com/login.jsp?jsessionid=abc123 when the victim clicks the link, tomcat will start using "abc123" as the victim's session identifier. The attacker now knows the victim's session identifier.

An application can prevent session fixation by issuing a new session identifier whenever a user goes through the authentication process. In this way any session identifier supplied by the attacker will be discarded. Unfortunately, not all applications do this, and it would be difficult to add this behavior to an application. The runtime security module 117 can determine situations in which an attacker is attempting to force a particular session identifier on a user. Since session identifiers are usually passed as cookies, if the security module sees a session identifier passed as a URL parameter, it can flag the request as being the result of a session fixation attack and respond appropriately. The security module 116 enables the runtime security module 117 to examine all HTTP requests for session identifier parameters by modifying the application deployment descriptor. (See Appendix A for an example of a deployment descriptor before and after modification by the security module 116.)

The invention uses a number of techniques to respond to an attack. The administrator configures the runtime security module 117 so that the response will be appropriate for the type of application and the type of attack. The administrator can change the way the module responds to an attack without restarting the program, so it is possible for an application to take an increased or more relaxed defensive posture depending on the administrator's perception of the current threats to the program.

The runtime security module 117 can respond to an attack in one or more of the following ways:

Log: create a log file entry indicating that an attack has taken place.

Alert: send an e-mail message or contact a pager with a short summary of the attack that has taken place.

Stop processing request: abort the processing of the HTTP request, either by throwing an exception or by not passing the request on to the program.

Defuse attack: Remove, alter, or render ineffective a dangerous piece of data. For example, a privacy violation might be defused by replacing most of the digits of a credit card number with the letter "X". This is a dangerous course of action—attackers may be able to trick the protection logic into modifying the data to their advantage. However, it may be desirable to not immediately acknowledge to an attacker that the program has detected malicious intent. By defusing the attack but not denying the request, the program may succeed in obscuring the defensive capabilities of the program.

Issue a challenge: Some forms of attack can be defeated by interrupting the normal flow of the application and presenting the user with a challenge. The challenge may only attempt to discern between a human and a computer. (This type of challenge is known as a kaptcha.) Alternatively, it may ask the user to prove their identity by providing a piece of identifying information (their home address or telephone number, for example).

Slow down application: An effective countermeasure for attacks that require the attacker to make a significant number of repeated guesses (Session ID guessing, for example) is to slow down the application's rate of response. If the application detects that an attacker is trying to guess a legitimate session ID, if the application responds to the attacker's guesses at a fraction of the usual speed, it will multiply the length of time the attacker needs in order for the attack to be successful. This defense might be all that is required, or it may simply serve as a stall tactic until a program administrator can assess the situation.

Shut down application: Cause the application to stop responding to any further user requests. This is a drastic action, but it may be the only safe thing to do if the application has been corrupted by an attacker.

User defined: turn the attack information over to a program-specific handler that has been written for this purpose.

Attention now turns to various ways of grouping the problems addressed by various embodiments of the invention. The invention may be used to protect against injection vulnerabilities. Injection vulnerabilities share the common attribute that an attacker sends malicious data into an application. The application sends the malicious data to a sensitive operation, where it allows the attacker to take an action that the application is not designed to allow. SQL injection, command injection, resource injection, log forging and cross site scripting are examples of injection vulnerabilities addressed in accordance with embodiments of the invention.

Embodiments of the invention are also useful against repetitive attacks. Repetitive attacks are characterized by an increased frequency of unusual operations or errors. Session ID guessing, credential guessing, click fraud and site probing are examples of repetitive attacks addressed in accordance with embodiments of the invention.

Embodiments of the invention also protect against attacks upon sensitive information. An attack upon sensitive information results in the return of unauthorized information to an attacker. Error mining, sensitive data extraction, and privacy violation are examples of attacks upon sensitive information that are prevented in accordance with embodiments of the invention.

Embodiments of the invention also protect against attribute attacks by examining specific attributes of an individual HTTP request. Session fixation, anonymous access, publicly available attack tools and forceful browsing are examples of attribute attacks addressed in accordance with embodiments of the invention.

The invention protects software against attack and malicious use. The invention operates by first inserting code into a program, then using the inserted code to monitor the program's behavior at runtime in order to log suspicious behavior, intercept attacks, and take defensive action. The instrumented program is able to communicate with a central server so that, if the program runs on multiple computers, the central server can detect attacks that span computers. The central server also allows an administrator to monitor the performance and behavior of the system and allows the administrator to modify the defensive configuration of the program (the way the program responds to attacks) if the situation so warrants.

By modifying the program, the invention is able to detect many broad categories of attacks with more accuracy and precision than previous approaches that only monitor through the host operating system or by observing the network traffic going to and from the program. Thus, the invention reduces the false negatives and false positives normally associated with application firewalls and intrusion prevention systems by making use of contextual information that is not available outside the running program. Embodiments of the invention focus on web-based attacks and support applications that run on more than one computer.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

APPENDIX A

Deployment descriptors
This is a sample deployment descriptor prior to modification by Application defense.

```xml
<?xml version="1.0" encoding="ISO-8859-1"?>
<!DOCTYPE web-app
    PUBLIC "-//Sun Microsystems, Inc.//DTD Web Application 2.3//EN"
    http://java.sun.com/dtd/web-app_2_3.dtd>
<web-app>
    <filter>
        <filter-name>Request Dumper Filter</filter-name>
        <filter-class>filters.RequestDumperFilter</filter-class>
    </filter>
    <filter-mapping>
        <filter-name>Request Dumper Filter</filter-name>
        <url-pattern>/*</url-pattern>
    </filter-mapping>
    <listener>
            <listener-class>com.order.splc.DatabaseController</listener-class>
    </listener>
    <servlet>
        <servlet-name>FileCatcherServlet</servlet-name>
        <servlet-class>com.fortify.ssm.msging.FileCatcherServlet</servlet-class>
        <init-param>
            <param-name>maxMemorySize</param-name>
                <param-value>2000000</param-value>
        </init-param>
        <init-param>
            <param-name>maxRequestSize</param-name>
                <param-value>2000000</param-value>
        </init-param>
         <init-param>
            <param-name>tempDirectory</param-name>
            <param-value>/tmp/</param-value>
         </init-param>
        <load-on-startup/>
    </servlet>
    <servlet>
            <servlet-name>action</servlet-name>
            <servlet-class>org.apache.struts.action.ActionServlet</servlet-class>
            <init-param>
                <param-name>config</param-name>
                <param-value>/WEB-INF/struts-config.xml</param-value>
            </init-param>
            <init-param>
                <param-name>debug</param-name>
                <param-value>2</param-value>
            </init-param>
            <init-param>
                <param-name>detail</param-name>
                <param-value>2</param-value>
            </init-param>
            <load-on-startup>2</load-on-startup>
    </servlet>
    <servlet-mapping>
        <servlet-name>FileCatcherServlet</servlet-name>
            <url-pattern>/FileCatcher</url-pattern>
    </servlet-mapping>
    <servlet-mapping>
            <servlet-name>action</servlet-name>
            <url-pattern>*.do</url-pattern>
    </servlet-mapping>
    <welcome-file-list>
```

APPENDIX A-continued

Deployment descriptors
This is a sample deployment descriptor prior to modification by Application defense.

```xml
        <welcome-file>pages/index.jsp</welcome-file>
</welcome-file-list>
<taglib>
        <taglib-uri>/tags/struts-bean</taglib-uri>
        <taglib-location>/WEB-INF/struts-bean.tld</taglib-location>
</taglib>
<taglib>
        <taglib-uri>/tags/struts-html</taglib-uri>
        <taglib-location>/WEB-INF/struts-html.tld</taglib-location>
</taglib>
<taglib>
        <taglib-uri>/tags/struts-logic</taglib-uri>
        <taglib-location>/WEB-INF/struts-logic.tld</taglib-location>
</taglib>
<taglib>
        <taglib-uri>/tags/struts-nested</taglib-uri>
        <taglib-location>/WEB-INF/struts-nested.tld</taglib-location>
</taglib>
<taglib>
        <taglib-uri>/tags/struts-template</taglib-uri>
        <taglib-location>/WEB-INF/struts-template.tld</taglib-location>
</taglib>
<taglib>
        <taglib-uri>/tags/struts-tiles</taglib-uri>
        <taglib-location>/WEB-INF/struts-tiles.tld</taglib-location>
</taglib>
   <resource-ref>
        <description>DB Connection</description>
        <res-ref-name>jdbc/splc</res-ref-name>
        <res-type>javax.sql.DataSource</res-type>
        <res-auth>Container</res-auth>
   </resource-ref>
<security-constraint>
        <display-name>Admin Constraint</display-name>
        <web-resource-collection>
            <web-resource-name>Admin Area</web-resource-name>
            <url-pattern>/pages/index.jsp</url-pattern>
            <url-pattern>*.do</url-pattern>
            <url-pattern>/FileCatcher</url-pattern>
            <http-method>GET</http-method>
            <http-method>HEAD</http-method>
            <http-method>POST</http-method>
        </web-resource-collection>
        <auth-constraint>
            <description>only admin</description>
            <role-name>admin</role-name>
        </auth-constraint>
</security-constraint>
<security-constraint>
        <display-name>User Constraint</display-name>
        <web-resource-collection>
            <web-resource-name>User Area</web-resource-name>
            <url-pattern>/pages/index.jsp</url-pattern>
            <url-pattern>*.do</url-pattern>
            <url-pattern>/FileCatcher</url-pattern>
            <http-method>GET</http-method>
            <http-method>HEAD</http-method>
            <http-method>POST</http-method>
        </web-resource-collection>
        <auth-constraint>
           <description>all users</description>
           <role-name>user</role-name>
        </auth-constraint>
    </security-constraint>
    <login-config>
      <auth-method>FORM</auth-method>
      <realm-name>Authentication</realm-name>
      <form-login-config>
         <form-login-page>/login/login.jsp</form-login-page>
         <form-error-page>/login/error.jsp</form-error-page>
      </form-login-config>
    </login-config>
```

APPENDIX A-continued

Deployment descriptors
This is a sample deployment descriptor prior to modification by Application defense.

```
        <security-role>
                <role-name>admin</role-name>
        </security-role>
        <security-role>
                <role-name>user</role-name>
        </security-role>
</web-app>
```

This is the same application deployment descriptor after being modified by Application Defense. Additions are in bold.

```
<?xml version="1.0" encoding="UTF-8"?>
<!DOCTYPE web-app PUBLIC "-//Sun Microsystems, Inc.//DTD Web Application 2.3//
EN"
"http://java.sun.com/dtd/web-app_2_3.dtd">
<web-app>
    <filter>
      <filter-name>Request Dumper Filter</filter-name>
      <filter-class>filters.RequestDumperFilter</filter-class>
    </filter>
   <filter>
      <filter-name>FortifyAppDefenseValidation</filter-name>
      <filter-
class>com.fortify.appdefense.runtime.analyzer.InputValidation</filter-class>
   </filter>
   <filter-mapping>
      <filter-name>FortifyAppDefenseValidation</filter-name>
      <url-pattern>/*</url-pattern>
   </filter-mapping>
     <listener>
            <listener-
class>com.fortify.appdefense.runtime.analyzer.SystemOutListener</listener-class>
     </listener>
<filter-mapping>
      <filter-name>Request Dumper Filter</filter-name>
      <url-pattern>/*</url-pattern>
    </filter-mapping>
    <listener>
            <listener-class>com.order.splc.DatabaseController</listener-class>
    </listener>
    <servlet>
     <servlet-name>FileCatcherServlet</servlet-name>
     <servlet-class>com.fortify.ssm.msging.FileCatcherServlet</servlet-class>
     <init-param>
         <param-name>maxMemorySize</param-name>
             <param-value>2000000</param-value>
     </init-param>
     <init-param>
         <param-name>maxRequestSize</param-name>
             <param-value>2000000</param-value>
     </init-param>
     <init-param>
         <param-name>tempDirectory</param-name>
             <param-value>/tmp/</param-value>
       </init-param>
     <load-on-startup/>
    </servlet>
    <servlet>
            <servlet-name>action</servlet-name>
            <servlet-class>org.apache.struts.action.ActionServlet</servlet-class>
            <init-param>
                  <param-name>config</param-name>
                  <param-value>/WEB-INF/struts-config.xml</param-value>
            </init-param>
            <init-param>
                  <param-name>debug</param-name>
                  <param-value>2</param-value>
            </init-param>
            <init-param>
                  <param-name>detail</param-name>
                  <param-value>2</param-value>
            </init-param>
            <load-on-startup>2</load-on-startup>
```

This is the same application deployment descriptor after being modified by Application Defense. Additions are in bold.

```
        </servlet>
    <servlet>
        <servlet-name>FortifyAppDefenseConfig</servlet-name>
        <servlet-
class>com.fortify.appdefense.runtime.config.ConfigServlet</servlet-class>
        <load-on-startup>1</load-on-startup>
    </servlet>
        <servlet-mapping>
                <servlet-name>FortifyAppDefenseConfig</servlet-name>
                <url-pattern>/FortifyAppDefenseConfig</url-pattern>
        </servlet-mapping>
<servlet-mapping>
        <servlet-name>FileCatcherServlet</servlet-name>
        <url-pattern>/FileCatcher</url-pattern>
    </servlet-mapping>
    <servlet-mapping>
            <servlet-name>action</servlet-name>
            <url-pattern>*.do</url-pattern>
    </servlet-mapping>
<!-- The Usual Welcome File List -->
<welcome-file-list>
        <welcome-file>pages/index.jsp</welcome-file>
</welcome-file-list>
<!-- Struts Tag Library Descriptors -->
<taglib>
        <taglib-uri>/tags/struts-bean</taglib-uri>
        <taglib-location>/WEB-INF/struts-bean.tld</taglib-location>
</taglib>
<taglib>
        <taglib-uri>/tags/struts-html</taglib-uri>
        <taglib-location>/WEB-INF/struts-html.tld</taglib-location>
</taglib>
<taglib>
        <taglib-uri>/tags/struts-logic</taglib-uri>
        <taglib-location>/WEB-INF/struts-logic.tld</taglib-location>
</taglib>
<taglib>
        <taglib-uri>/tags/struts-nested</taglib-uri>
        <taglib-location>/WEB-INF/struts-nested.tld</taglib-location>
</taglib>
<taglib>
        <taglib-uri>/tags/struts-template</taglib-uri>
        <taglib-location>/WEB-INF/struts-template.tld</taglib-location>
</taglib>
<taglib>
        <taglib-uri>/tags/struts-tiles</taglib-uri>
        <taglib-location>/WEB-INF/struts-tiles.tld</taglib-location>
</taglib>
    <resource-ref>
        <description>DB Connection</description>
        <res-ref-name>jdbc/splc</res-ref-name>
        <res-type>javax.sql.DataSource</res-type>
        <res-auth>Container</res-auth>
    </resource-ref>
<security-constraint>
    <display-name>Admin Constraint</display-name>
    <web-resource-collection>
        <web-resource-name>Admin Area</web-resource-name>
        <url-pattern>/pages/index.jsp</url-pattern>
        <url-pattern>*.do</url-pattern>
        <url-pattern>/FileCatcher</url-pattern>
        <http-method>GET</http-method>
        <http-method>HEAD</http-method>
        <http-method>POST</http-method>
    </web-resource-collection>
    <auth-constraint>
        <description>only admin</description>
        <role-name>admin</role-name>
    </auth-constraint>
</security-constraint>
<security-constraint>
    <display-name>User Constraint</display-name>
    <web-resource-collection>
        <web-resource-name>User Area</web-resource-name>
        <url-pattern>/pages/index.jsp</url-pattern>
        <url-pattern>*.do</url-pattern>
        <url-pattern>/FileCatcher</url-pattern>
```

This is the same application deployment descriptor after being modified by Application Defense. Additions are in bold.

```
            <http-method>GET</http-method>
            <http-method>HEAD/http-method>
            <http-method>POST</http-method>
        </web-resource-collection>
        <auth-constraint>
            <description>all users</description>
            <role-name>user</role-name>
        </auth-constraint>
    </security-constraint>
    <login-config>
       <auth-method>FORM</auth-method>
       <realm-name>Authentication</realm-name>
       <form-login-config>
          <form-login-page>/login/login.jsp</form-login-page>
          <form-error-page>/login/error.jsp</form-error-page>
       </form-login-config>
    </login-config>
       <security-role>
             <role-name>admin</role-name>
       </security-role>
       <security-role>
             <role-name>user</role-name>
       </security-role>
</web-app>
```

The invention claimed is:

1. A non-transitory computer readable storage medium, comprising executable instructions to:

perform an automated analysis of program instructions using a security module to analyze application output prior to the program instructions being invoked, wherein the automated analysis includes an automated analysis of injection vulnerabilities, an automated analysis of potential repetitive attacks including session ID guessing, credential guessing, click fraud and site probing, an automated analysis of sensitive information, and an automated analysis of specific HTTP attributes;

select and insert protective instructions into the program instructions based on the automated analysis of the injection vulnerabilities, wherein the protective instructions comprise a call that generates a security event during runtime; and utilize a runtime security module to detect and respond to attacks by analyzing the generated security event during execution of the program instructions.

2. The computer readable storage medium of claim 1 wherein the automated analysis of injection vulnerabilities includes a separate automated analysis of SQL injection, command injection, resource injection, log forging and cross site scripting.

3. The computer readable storage medium of claim 1 wherein sensitive information includes error mining, sensitive data extraction, and a privacy violation.

4. The computer readable storage medium of claim 1 wherein specific HTTP attributes include session fixation, anonymous access, publicly available attack tools, and forceful browsing.

5. The compute readable storage medium of claim 1, wherein the executable instructions include executable instructions to log information.

6. The compute readable storage medium of claim 1, wherein the executable instructions include executable instructions to generate an alert.

7. The computer readable storage medium of claim 1, wherein the executable instructions include executable instructions to halt the processing of a request.

8. The compute readable storage medium of claim 1, wherein the executable instructions include executable instructions to defuse an attack.

9. The compute readable storage medium of claim 1, wherein the executable instructions include executable instructions to issue a challenge.

10. The compute readable storage medium of claim 1, wherein the executable instructions include executable instructions to slow down an application.

11. The compute readable storage medium of claim 1, wherein the executable instructions include executable instructions to shut down an application.

12. The compute readable storage medium of claim 1, wherein the executable instructions include executable instructions to invoke a user-defined response.

13. A non-transitory computer readable storage medium, comprising executable instructions to:

perform an automated analysis of program instructions using a security module to analyze application output prior to the program instructions being invoked, wherein the automated analysis includes a separate automated analysis of potential repetitive attacks including;
session ID guessing,
credential guessing,
click fraud, and
site probing;

select and insert protective instructions into the program instructions in response to and based on the automated analysis, wherein the protective instructions comprise a call that generates a security event during runtime; and utilize a runtime security module to invoke a runtime security module that operates to detect and respond to attacks by analyzing the generated security event during execution of the program instructions.

14. The computer readable storage medium of claim 13 wherein the automated analysis includes an automated analysis of injection vulnerabilities, an automated analysis of sensitive information, and an automated analysis of specific HTTP attributes.

15. The computer readable storage medium of claim 14 wherein the automated analysis of injection vulnerabilities includes a separate automated analysis of SQL injection, command injection, resource injection, log forging and cross site scripting.

16. The computer readable storage medium of claim 14 wherein sensitive information includes error mining, sensitive data extraction, and a privacy violation.

17. The computer readable storage medium of claim 14 wherein specific HTTP attributes include session fixation, anonymous access, publicly available attack tools, and forceful browsing.

* * * * *

UNITED STATES PATENT AND TRADEMARK OFFICE
CERTIFICATE OF CORRECTION

| | | |
|---|---|---|
| PATENT NO. | : 8,347,392 B2 | Page 1 of 1 |
| APPLICATION NO. | : 11/510135 | |
| DATED | : January 1, 2013 | |
| INVENTOR(S) | : Brian Chess et al. | |

It is certified that error appears in the above-identified patent and that said Letters Patent is hereby corrected as shown below:

In the Claims

In column 33, line 59, in Claim 5, delete "compute" and insert -- computer --, therefor.

In column 33, line 62, in Claim 6, delete "compute" and insert -- computer --, therefor.

In column 33, line 65, in Claim 7, delete "compute" and insert -- computer --, therefor.

In column 34, line 27, in Claim 8, delete "compute" and insert -- computer --, therefor.

In column 34, line 30, in Claim 9, delete "compute" and insert -- computer --, therefor.

In column 34, line 33, in Claim 10, delete "compute" and insert -- computer --, therefor.

In column 34, line 36, in Claim 11, delete "compute" and insert -- computer --, therefor.

In column 34, line 39, in Claim 12, delete "compute" and insert -- computer --, therefor.

In column 34, line 48, in Claim 13, delete "including;" and insert -- including: --, therefor.

Signed and Sealed this
Seventh Day of May, 2013

Teresa Stanek Rea
*Acting Director of the United States Patent and Trademark Office*